(12) United States Patent
Xiaoyu et al.

(10) Patent No.: US 7,262,541 B2
(45) Date of Patent: Aug. 28, 2007

(54) MICRO-OSCILLATION ELEMENT INCORPORATING SPRINGS

(75) Inventors: Mi Xiaoyu, Kawasaki (JP); Satoshi Ueda, Kawasaki (JP); Hisao Okuda, Kawasaki (JP); Osamu Tsuboi, Kawasaki (JP); Hiromitsu Soneda, Kawasaki (JP); Norinao Kouma, Kawasaki (JP); Ippei Sawaki, Kawasaki (JP); Yoshitaka Nakamura, Yokohama (JP)

(73) Assignee: Fujitsu Limited, Kawasaki (JP)

( * ) Notice: Subject to any disclaimer, the term of this patent is extended or adjusted under 35 U.S.C. 154(b) by 89 days.

(21) Appl. No.: 10/791,787

(22) Filed: Mar. 4, 2004

(65) Prior Publication Data

US 2005/0046504 A1    Mar. 3, 2005

(30) Foreign Application Priority Data

Aug. 12, 2003   (JP) ............................. 2003-292553
Dec. 10, 2003   (JP) ............................. 2003-412332

(51) Int. Cl.
*H02N 1/00*   (2006.01)
*G02B 26/10*  (2006.01)

(52) U.S. Cl. .................. 310/309; 359/224; 359/225; 359/291; 385/18

(58) Field of Classification Search ................ 310/309; 359/223–226, 290, 291
See application file for complete search history.

(56) References Cited

U.S. PATENT DOCUMENTS

| | | | |
|---|---|---|---|
| 5,583,688 A | 12/1996 | Hornbeck | 359/291 |
| 5,629,794 A | 5/1997 | Magel et al. | 359/290 |
| 5,739,941 A * | 4/1998 | Knipe et al. | 359/224 |
| 5,740,150 A | 4/1998 | Uchimaru et al. | 369/119 |
| 6,122,089 A * | 9/2000 | Minamoto et al. | 359/198 |
| 6,262,827 B1 | 7/2001 | Ueda et al. | 359/224 |
| 6,360,035 B1 * | 3/2002 | Hurst et al. | 385/18 |
| 6,831,765 B2 * | 12/2004 | Yasuda et al. | 359/224 |
| 6,882,455 B2 * | 4/2005 | Arima | 359/224 |
| 2003/0007262 A1 * | 1/2003 | Tsuboi et al. | 359/847 |
| 2003/0053186 A1 * | 3/2003 | Arima | 359/224 |
| 2003/0117687 A1 * | 6/2003 | Murakami et al. | 359/291 |
| 2005/0094931 A1 | 5/2005 | Yokoyama et al. | 385/18 |

FOREIGN PATENT DOCUMENTS

| | | |
|---|---|---|
| EP | 1234799 A2 | 8/2002 |
| JP | 62-198820 | 9/1987 |
| JP | 04-217222 | 8/1992 |
| JP | 7-287177 | 10/1995 |
| JP | 09-101467 | 4/1997 |

(Continued)

OTHER PUBLICATIONS

Machine Translation of JP 2002-214560, "Actuator", Tokuda.*

*Primary Examiner*—Karl Tamai
(74) *Attorney, Agent, or Firm*—Kratz, Quintos & Hanson, LLP.

(57) ABSTRACT

A micro-oscillation element includes an oscillation section and a frame. The oscillation section is provided with a mirror surface and is connected to the frame via trapezoidal first and second springs. The oscillation section is located between the first spring and the second spring. Each of the first spring and the second spring is deformable along with the oscillation of the oscillation section.

15 Claims, 15 Drawing Sheets

FOREIGN PATENT DOCUMENTS

| | | |
|---|---|---|
| JP | 9-146032 | 6/1997 |
| JP | 9-146034 | 6/1997 |
| JP | 10-62709 | 3/1998 |
| JP | 2001-13443 | 1/2001 |
| JP | 2001-525972 | 12/2001 |
| JP | 2002214560 * | 7/2002 |
| JP | 2002-250890 | 9/2002 |
| JP | 2002-321196 | 11/2002 |
| JP | 2003-207737 | 7/2003 |
| WO | WO98/09289 | 3/1998 |
| WO | WO 03/062899 | 7/2003 |

\* cited by examiner

FIG. 14
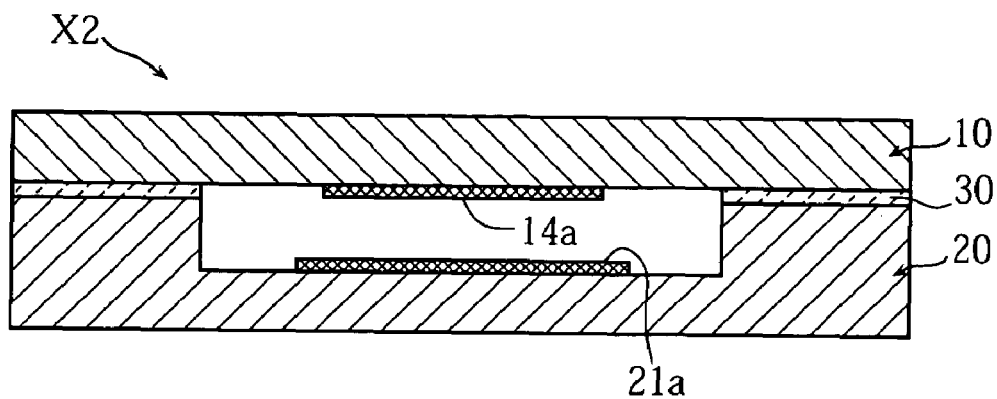
FIG. 15A
FIG. 15B
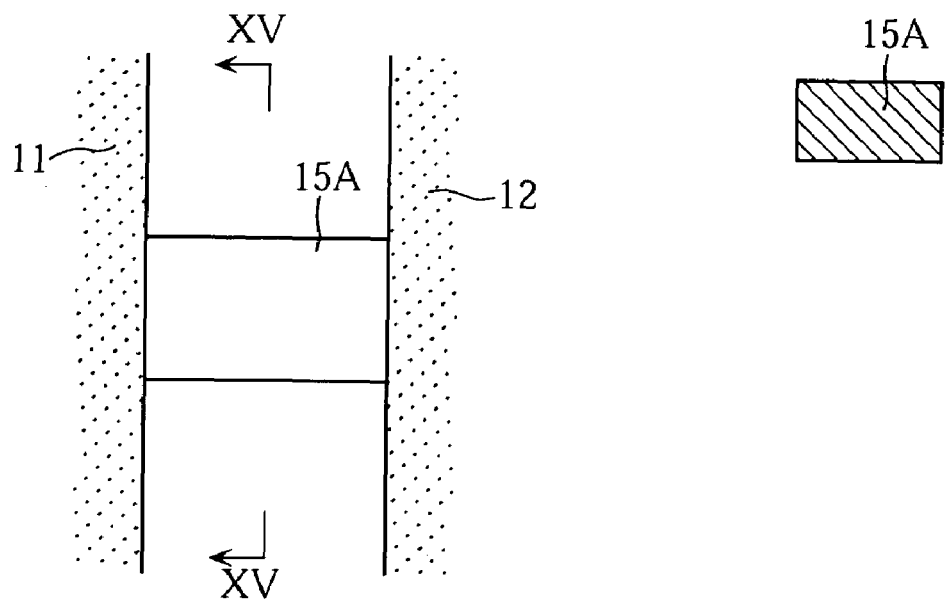

MICRO-OSCILLATION ELEMENT INCORPORATING SPRINGS

BACKGROUND OF THE INVENTION

1. Field of the Invention

The present invention relates to a micro-oscillation element that has an oscillating section for which rotary displacement is possible. More particularly, the present invention relates to a micro-oscillation element which can be applied to a micro-mirror element, which is built into such optical devices as optical measurement devices for performing precision measurement using light waves, optical disk devices for recording and reproducing data for optical disks, and optical switching devices for switching the optical paths between a plurality of optical fibers, so as to change the traveling direction of the light.

2. Description of the Related Art

Recently the application of MEMS (Micro-Electro-Mechanical-System) devices, which have a microstructure created by micro-machining technology, are being attempted in various technical fields. For example, in the field of optical communication technology, micro-mirror elements having light reflecting functions are receiving attention.

A micro-mirror element has a mirror face for reflecting light, and can change the reflecting direction of the light by the oscillation of this mirror face. Electrostatic driving type micro-mirror elements, which use electrostatic force for oscillating the mirror face, are used for many optical devices. Electrostatic drive type micro-mirror elements can roughly be classified into two: micro-mirror elements manufactured by so called surface micro-machining technology, and micro-mirror elements manufactured by so called bulk micro-machining technology.

In surface micro-machining technology, material thin films corresponding to each composing region are processed into a desired pattern on the substrate, and by layering such patterns sequentially, each region of constructing elements, such as a support, mirror face and electrode, and a sacrifice layer to be the removed layer, are created. An electrostatic driving type micro-mirror element by such a surface micro-machining technology is disclosed, for example, in Japanese Patent Application Laid-Open No. H7-287177. In bulk micro-machining technology, on the other hand, the support and mirror section are formed into a desired shape by etching the material substrate itself, and the mirror face and electrode are created with a thin film when necessary. A bulk micro-machining technology is disclosed, for example, in Japanese Patent Application Laid-Open No. H9-146032, No. H9-146034, No. H10-62709 and No. 2001-13443.

One technical issue which is required for micro-mirror element is the high flatness of the mirror face which reflects light. However, according to surface micro-machining technology, where a mirror face to be finally created is thin, the mirror face tends to warp, and it is difficult to implement high flatness on the entire mirror face over a wide area. Whereas in bulk micro-machining technology, where a mirror face is disposed on the mirror section which is created by etching a relatively thick material substrate itself using etching technology, the rigidity of the mirror section can be more easily insured over a wide area of the mirror face. Therefore bulk micro-machining technology is preferable for creating a mirror face which has a sufficiently high optical flatness.

FIG. 24 and FIG. 25 show a conventional electrostatic driving type micro-mirror element X6 fabricated by bulk micro-machining technology. FIG. 24 is an exploded perspective view of the micro-mirror element X6, and FIG. 25 is a cross-sectional view along the XXV-XXV line in FIG. 24, of an assembled micro-mirror element X6.

The micro-mirror element X6 has a structure where the mirror substrate 60 and the base substrate 66 are layered. The mirror substrate 60 is comprised of a mirror section 61, a frame 62 and a pair of torsion bars 63 connected to these. The external forms of the mirror section 61, frame 62 and the pair of torsion bars 63 can be formed by etching one side of a predetermined material substrate, such as a silicon substrate which has conductivity. On the front face of the mirror section 61, the mirror face 64 is created. On the rear face of the mirror section 61, a pair of electrodes 65a and 65b are disposed. The pair of torsion bars 63 specifies the rotation axis A6 in the later mentioned oscillation operation of the mirror section 61. On the base substrate 66, the electrode 67a, which faces the electrode 65a of the mirror section 61, and the electrode 67b, which faces the electrode 65b thereof, are disposed.

In the micro-mirror element X6, when potential is applied to the frame 62 of the mirror substrate 60, the potential is transferred to the electrode 65a and the electrode 65b via the pair of torsion bars 63 and the mirror section 61, which are integrated with the frame 62 using a same conductive material. Therefore by applying a predetermined potential to the frame 62, the electrodes 65a and 65b can be charged to positive, for example. If the electrode 67a of the base substrate 66 is charged to negative in this status, electrostatic attraction is generated between the electrode 65a and the electrode 67a, and the mirror section 61 oscillates in the direction of the arrow M6 with twisting the pair of torsion bars 63, as shown in FIG. 25. The mirror section 61 can oscillate to the angle at which the electrostatic attraction between the electrodes and the total of the torsional resistance of the torsion bars 63 balance. If the electrode 67b is charged to negative in the status where the electrodes 65a and 65b of the mirror section 61 are charged to positive, on the other hand, electrostatic attraction is generated between the electrode 65b and the electrode 67b, and the mirror section 61 can oscillate to a direction opposite of the arrow M6. By such an oscillation driving of the mirror section 61, the reflection direction of the light, which is reflected by the mirror face 64, can be switched.

In order to increase the resonance frequency of the mirror section 61 (e.g. several hundred kHz or more), to meet the demand for high-speed operation in the micro-mirror element X6, a method of increasing the rigidity of the torsional direction (torsional rigidity) of the torsion bar 63 to increase the rotational rigidity of the mirror section 61, or a method of decreasing the mass of the mirror section 61 so as to decrease the moment of inertia thereof (polar moment of inertia of area with respect to the axis A6) may be used in prior art. Generally the resonance frequency of the mirror section (region which performs the rotary operation) of the element is given by the following formula (1). In formula (1), $f_0$ is a resonance frequency of the mirror section, K is a rotational rigidity of the mirror section, and I is a moment of inertia of the mirror section (polar moment of inertia of area with respect to the axis).

$$f_0 = \sqrt{\frac{K}{I}} \quad (1)$$

According to formula (1), for the mirror section 61 of the micro-mirror element X6, a higher resonance frequency can be obtained as the rotational rigidity thereof is higher, or as the moment of inertia thereof is lower. As the torsional rigidity of the torsion bar 63 is higher, the rotational rigidity of the mirror section 61 becomes higher, and the potential energy to be stored in this torsion bar 63, when the mirror section 61 oscillates in one direction, increases, and therefore the quantity of potential energy, which is released from the torsion bar 63 when the mirror section 61 oscillates to the opposite direction after this oscillation in one direction, and is converted into kinetic energy, increases, which is suitable for obtaining a high resonance frequency. As the moment of inertia of the mirror section 61 decreases, the driving force required for a predetermined oscillation operation of the mirror section 61 is smaller, so this is suitable for obtaining a high resonance frequency.

A known method of increasing the torsional rigidity of the torsion bar 63 is increasing the thickness and width of the torsion bar 63 so as to increase the cross-section area thereof. However, the thickness of the torsion bar 63 must be set to the thickness of the mirror section 61 or less, for practical reasons. If the thickness of the torsion bar 63 exceeds the thickness of the mirror section 61, then the torsional rigidity of the torsion bar 63 increases excessively, and in this case even if a driving force of the mirror section 61 is generated, this torsion bar 63 cannot be appropriately twisted, and the mirror section 61 tends to deform. If the width of the torsion bar 63 is inappropriately increased, this too increases excessively the torsional rigidity of the torsion bar 63, and in this case, even if a drive forcing of the mirror section 61 is generated, this torsion bar 63 cannot be appropriately twisted, and the mirror section 61 tends to deform.

A known method for decreasing the moment of inertia of the mirror section 61 by decreasing the weight thereof is decreasing the thickness of the mirror section 61. However, as the mirror section 61 becomes thinner, the mirror section 61 itself tends to deflect, and assuring the flatness of the mirror face 64 tends to become difficult. If the flatness of the mirror face 64 cannot be sufficiently assured, an appropriate light reflection function cannot be implemented in the micro-mirror element X6.

In this way, prior art has difficulty to operate a micro-mirror element or a micro-oscillation element at a high resonance frequency.

SUMMARY OF THE INVENTION

The present invention has been proposed under the circumstances described above. It is therefore an object of the present invention to provide a micro-oscillation element which is suitable for operating at a high resonance frequency.

According to a first aspect of the present invention, there is provided a micro-oscillation element comprising: an oscillation section; a main frame; and a first spring and a second spring that cause the oscillation section to be supported by the frame. The oscillation section is located between the first spring and the second spring, and each of the first spring and the second spring is deformable along with oscillation of the oscillation section.

In the micro-oscillation element having the above configuration, the rotational rigidity of the oscillation section can be acquired by the first and second springs, which deflect along with the oscillation operation of the oscillation section. This is because the first and second springs apply the deflection resistance, generated by the deflection rigidity and flexural rigidity, to the oscillation operation of the oscillation section respectively. This is physically equivalent to a torsion bar applying the torsional resistance, generated by the torsional rigidity, to the oscillation operation when a torsion bar, which connects the oscillation section and the frame and which defines the oscillation axis in the oscillation operation of the oscillation section, exists. Therefore in the micro-oscillation element according to the first aspect of the present invention, it is possible to acquire a desired high rotational rigidity for the oscillation section by appropriately adjusting the deflection rigidity of the first and second springs. This element can also be constructed such that the oscillation section appropriately oscillates without using a torsion bar which connects the oscillation section and frame.

According to the present invention, while a driving force is applied to a predetermined oscillation end of the oscillation section in the oscillation direction, the first and second springs, which deflect along with the oscillation operation of the oscillation section, apply tensile force in a direction opposite from the oscillation direction on the oscillation section or the oscillation end thereof respectively. Therefore in the micro-oscillation element, a desired small moment of inertia can be implemented by achieving a sufficient thinness for the oscillation section, and an inappropriate deformation of the oscillation section in the oscillation direction can be prevented by appropriately adjusting the deflection rigidity of the first and second springs.

As described above, in the micro-oscillation element according to the first aspect of the present invention, a high rotational rigidity can be acquired and a small moment of inertia can be implement for the oscillation section. Such a micro-oscillation element is preferable for operating at a high resonance frequency so as to implement a high oscillation operation.

According to a second aspect of the present invention, the micro-oscillation element may further comprise: a first actuating section connected to the frame via the first spring; a second actuating section connected to the frame via the second spring; a first thin section connecting the oscillation section and the first actuating section; and a second thin section connecting the oscillation section and the second actuating section. The first and the second actuating sections are located between the first and the second springs, the oscillation section is located between the first and the second actuating sections, each of the first and the second actuating sections is movable in moving directions of the oscillation section, the first spring is deflectable as the first actuating section is displaced, and the second spring is deflectable as the second actuating section is displaced.

With the above arrangements, the rotational rigidity of the oscillation section can be acquired by the first and second springs, which deflect along with the oscillation operation of the oscillation section. This is because the first spring applies the deflection resistance generated by the deflection rigidity or flexural rigidity to the oscillation operation of the oscillation section via the first actuating section and the first thin section, and the second spring applies the deflection resistance generated by the deflection rigidity or flexural rigidity to the oscillation operation of the oscillation section via the second actuating section and the second thin section. Therefore in the micro-oscillation element according to the second aspect of the present invention as well, it is possible to acquire a desired high rotational rigidity for the oscillation section by appropriately adjusting the deflection rigidity of the first and second springs, just like the micro-oscillation element according to the first aspect.

According to the second aspect of the present invention, while a driving force in the oscillation direction is applied to a predetermined oscillation end of the oscillation section the first spring, which deflects along with the oscillation operation of the oscillation section, applies a tensile force in a direction opposite from the oscillation direction on the oscillation section or on one side of the oscillation ends thereof via the first actuating section and the first thin section. Also the second spring, which deflects along with the oscillation operation of the oscillation section, applies a tensile force in a direction opposite from the oscillation direction on the oscillation section or on the other side of the oscillation end thereof via the second actuating section and the second thin section. Therefore in the micro-oscillation element according to the second aspect of the present invention as well, a desired small moment of inertia can be implemented by achieving a sufficient thinness for the oscillation section, just like the micro-oscillation element according to the first aspect, and an inappropriate deformation of the oscillation section in the oscillation direction can be prevented by appropriately adjusting the deflection rigidity of the first and second springs.

As described above, in the micro-oscillation element according to the second aspect of the present invention, a high rotational rigidity can be acquired and a small moment of inertia can be implemented for the oscillation section.

Preferably, the first and second springs may be plate springs. A plate spring is preferable in order to create a spring having a desired deflection rigidity by bulk micromachining technology.

Preferably, the micro-oscillation element may further comprise at least one torsion bar for defining the oscillation axis for the oscillation operation of the oscillation section. In this case, it is preferable that the cross-section of the torsion bar, cutting orthogonally to the oscillation axis, is a cross shape. The cross-section area of the torsion bar may change along the oscillation axis. A torsion bar having such a configuration is preferable for implementing a predetermined oscillation operation around the axis for the oscillation section.

It is preferable that at least one of the first spring, second spring and torsion bar further comprises a rigidity adjustment means. The rigidity adjustment means is a single or a plurality of holes created on the spring or torsion bar. In this case, the single or plurality of holes may penetrate through the spring or torsion bar in the thickness direction, or in the width direction. A part of the plurality of holes may penetrate through the spring or torsion bar in the thickness direction, and another part of the plurality of holes may penetrate through the spring or torsion bar in the width direction. The rigidity adjustment means may have a form of a plurality of reinforcing ribs. These reinforcing ribs protrude in the width direction and/or the thickness direction of the spring or torsion bar. The width of the first spring, second spring or torsion bar may change in the area from the oscillation section, first actuating section or second actuating section to the frame. Instead of this, or along with this, the thickness of the first spring, second spring or torsion bar may change in the area from the oscillation section, first actuating section or second actuating section to the frame. By such a configuration as well, the deflection rigidity or torsional rigidity can be adjusted for the first spring, second spring or torsion bar.

The first spring and the second spring may be mutually displaced in the thickness direction of the micro-oscillation element or oscillation section. If the device comprises a pair of torsion bars which face each other via the oscillation section, this pair of torsion bars may be mutually displaced in the thickness direction of this device or oscillation section.

The micro-oscillation element may further comprise: a base section connected to the frame; and a third spring connecting the base section to the oscillation section. The third spring may have a pair of notches spaced from each other in a direction in which the first and the second springs are spaced from each other. Such a third spring is preferable to specify a predetermined oscillation axis for the oscillation section.

It is preferable that the micro-oscillation element of the present invention further comprises an actuator for generating a driving force for the oscillation operation of the oscillation section. In this case, it is preferable that the difference between the frequency of the drive force (driving torque) generated by the actuator and the resonance frequency of the oscillation operation of the oscillation section is 1% or less of this resonance frequency. The actuator is, for example, an electrostatic driving actuator comprised of a movable electrode disposed in the oscillation section and a fixed electrode disposed in the base section. Or the actuator is an electromagnetic actuator which includes a magnet and a coil which are disposed in the oscillation section and base section respectively. Or the actuator is comprised of a piezoelectric element connected to a spring or a torsion bar.

It is preferable that the oscillation section has an optical element. If the micro-oscillation element is a micro-mirror element, the optical element is a mirror face which reflects light. If a diffraction grating, light source or light detector, instead of a mirror face, is disposed in the oscillation section, the micro-oscillation element according to the present invention can be constructed as another functional element.

The micro-oscillation element of the present invention may further comprise displacement detection means for detecting the relative rotational displacement of the frame and the oscillation section. Such a configuration is preferable to implement a high precision oscillation operation for the oscillation section.

The micro-oscillation element of the present invention may further comprise: a second frame disposed outward of the main frame; and third and fourth springs connecting the second frame to the main frame. The main frame is located between the third spring and the fourth spring, and each of the third and the fourth springs is deformable along with oscillation of the main frame.

The above configuration of the micro-oscillation element corresponds to the configuration where the abovementioned second frame, the third spring and the fourth spring are added to the micro-oscillation element according to the first aspect of the present invention. Therefore according to the above arrangement, a high rotational rigidity can be acquired and a small moment of inertia can be implemented for the oscillation main section, just like the oscillation section in the first aspect. In addition, a high rotational rigidity can be acquired and a small moment of inertia can be implemented for the main frame, just like the abovementioned oscillation section in the first aspect. In this way, the micro-oscillation element according to the first aspect of the present invention can be constructed as a multi-axis micro-oscillation element.

Preferably, the direction in which the first and the second springs are spaced from each other may intersect the direction in which the third and the fourth springs are spaced from each other.

Preferably, the micro-oscillation element may further comprise: at least one torsion bar defining a first oscillation axis of oscillation of the oscillation section; and at least one torsion bar defining a second oscillation axis of oscillation of the main frame. The first oscillation axis and the second oscillation axis may intersect each other at 90°.

BRIEF DESCRIPTION OF THE DRAWINGS

FIG. 3A is a plan view, and FIG. 3B is a side view;

FIG. 4A is a plan view, FIG. 4B a side view, and FIG. 4C a cross-sectional view along the IV-IV line in FIG. 4A;

FIG. 5A is a plan view, FIG. 5B a side view, and FIG. 5C a cross-sectional view along the V-V line in FIG. 5A;

FIG. 6A is a plan view, and FIG. 6B a cross-sectional view along the VI-VI line in FIG. 6A;

FIGS. 7A-7B show another variant form of the spring in the micro-mirror element according to the present invention, wherein FIG. 7A is a plan view, and FIG. 7B a cross-sectional view along the VII-VII line in FIG. 7A;

FIGS. 8A-8B show another variant form of the spring in the micro-mirror element according to the present invention, wherein FIG. 8A is a plan view, and FIG. 8B a cross-sectional view along the VIII-VIII line in FIG. 8A;

FIG. 9 show another variant form of the spring in the micro-mirror element according to the present invention, wherein

FIG. 14 is a cross-sectional view along the XIV-XIV line in FIG. 12;

FIGS. 15A-15B show a variant form of the torsion bar in the micro-mirror element shown in FIG. 12, wherein FIG. 15A is a plan view, and FIG. 15B a cross-sectional view along the XV-XV line in FIG. 15A;

FIGS. 16A-16B show a variant form of the torsion bar in the micro-mirror element shown in FIG. 12, wherein FIG. 16A is a plan view, and FIG. 16B a cross-sectional view along the XVI-XVI line in FIG. 16A;

DETAILED DESCRIPTION OF THE PREFERRED EMBODIMENTS

Figure 1:
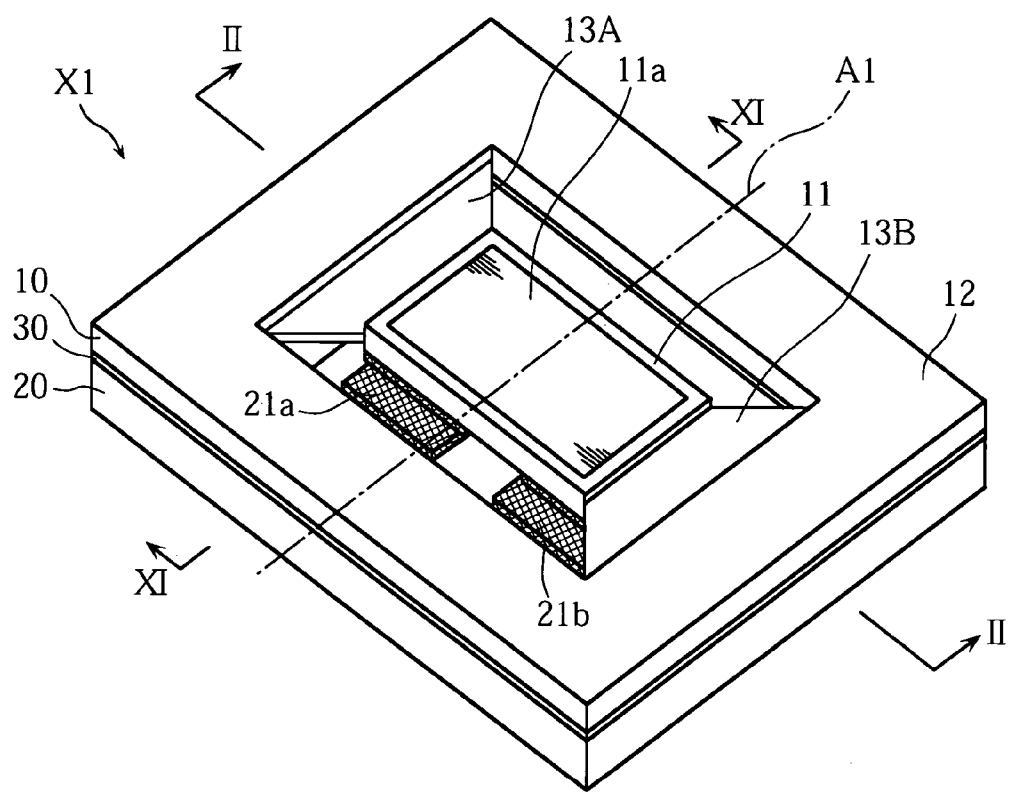
FIG. 1 is a perspective view depicting the micro-mirror element according to the first embodiment of the present invention.
Figure 2:
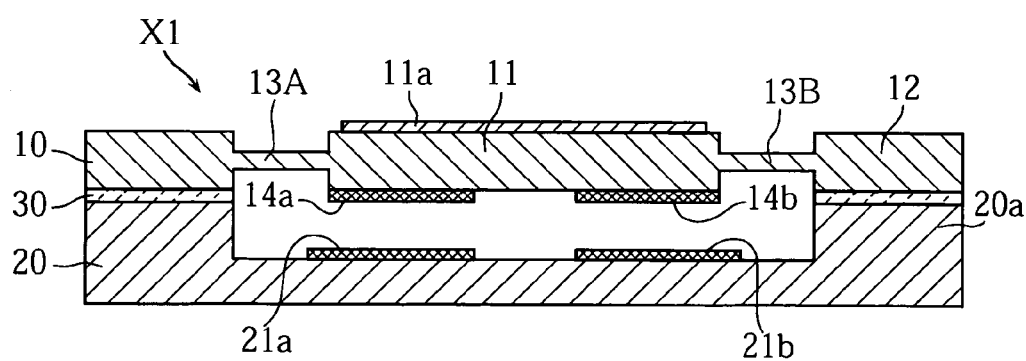
FIG. 2 is a cross-sectional view along the II-II line in FIG. 1.

FIG. 1 and FIG. 2 show the micro-mirror element X1 of the first embodiment of the present invention. FIG. 1 is a perspective view of the micro-mirror element X1, and FIG. 2 is a cross-sectional view along the II-II line in FIG. 1. The micro-mirror element X1 has a structure where the mirror substrate 10 and the base substrate 20 are layered via the insulation layer 30.

The mirror substrate 10 is comprised of a mirror section 11, a frame 12 surrounding this, and a pair of springs 13A and 13B which connect the mirror section 11 and the frame 12. The mirror substrate 10 is formed by bulk micro-machining technology, from a silicon substrate to which conductivity is provided by doping such n-type impurities as P and As, or by such a P-type impurity as B. Specifically, the mirror section 11, the frame 12 and the pair of springs 13A and 13B are formed on a plate type conductive silicon substrate by dry etching or by wet etching, which is performed using a mask for patterning. For the dry etching, Deep RIE (Reactive Ion Etching), for example, can be used. In the case of wet etching, a KOH solution can be used as the etchant. A description of the specific manufacturing method is omitted since this is not included in the essential character of the present invention.

The mirror face 11a is disposed on the front surface of the mirror section 11, and a pair of movable electrodes 14a and 14b are disposed on the rear surface thereof. The mirror face 11a and the movable electrodes 14a and 14b can be formed by depositing a predetermined metal material by a deposition method, for example, and then patterning the metal film. If the conductivity of the mirror substrate 10 is set sufficiently high by the doping impurities, then a predetermined location of the mirror section 11 itself can function as an electrode, so the movable electrodes 14a and 14b need not be disposed.

The base substrate 20 is made of silicon, for example, and is formed by bulk micro-machining technology so as to be concave at the center. The convex step section 20a around the periphery of the base substrate 20 has a shape corresponding to the frame 12 of the mirror substrate 10, and is bonded with the frame 12 via the insulation layer 30. The insulation layer 30 is made of silicon dioxide ($SiO_2$). A pair of fixed electrodes 21a and 21b, which face the movable electrodes 14a and 14b of the mirror section 11 at appropriate spacing, are disposed on the inner bottom face of the base substrate 20. The fixed electrode 21a and the movable electrode 14a constitute an actuator, which is comprised of a set of electrodes. In the same way, the fixed electrode 21b and the movable electrode 14b constitute an actuator, which is comprised of a set of electrodes. In this way, the micro-mirror element X1 is constructed with a flat electrode type actuator.

The springs 13A and 13B are located away from the oscillation axis A1 of the mirror section 11 which passes through the mirror section 11, and are integrated with the mirror section 11 and the frame 12 by processing the mirror substrate 10 by bulk micro-machining technology. In the present embodiment, the springs 13A and 13B have a trapezoidal shape, where the frame 12 side is wider and the mirror section side 11 is narrower, and have a uniform thickness in the width direction and length direction of the mirror section 11.

In the micro-mirror element X1, if the fixed electrode 21a of the base substrate 20 is charged to negative in the status where the movable electrodes 14a and 14b of the mirror section 11 are charged to positive, for example, then electrostatic attraction is generated between the fixed electrode 21a and the movable electrode 14a, and the mirror section 11 oscillates in the counterclockwise direction in FIG. 2 with the oscillation axis A1 as the center, while deflecting the spring 13A downward. If the fixed electrode 21b is charged to negative in the status where the movable electrodes 14a and 14b are charged to the positive, on the other hand, then electrostatic attraction is generated between the fixed electrode 21b and the movable electrode 14b, and the mirror section 11 oscillates to the clockwise direction in FIG. 2, with the oscillation axis A1 as the center, while deflecting the spring 13B downward. At such driving of the mirror section 11, electrostatic repulsion may be generated between the fixed electrode 21b and the movable electrode 14b when electrostatic attraction is generated between the fixed electrode 21a and the movable electrode 14a, and electrostatic repulsion may be generated between the fixed electrode 21a and the movable electrode 14a when electrostatic attraction is generated between the fixed electrode 21b and the movable electrode 14b. In this case, the springs 13A and 13B deflect in a direction opposite from each other, and the position of the oscillation axis A1 of the mirror section 11 stabilizes. The difference between the driving signal frequency of the actuator or the driving force (driving torque) by the actuator and the resonance frequency of the mirror section 11 in the oscillation operation is assumed to be 1% or less of this resonance frequency. By setting the difference between the frequency of the driving force (driving torque) generated in the mirror section 11 and the resonance frequency of the mirror section 11 to be in this range, the mirror section 11 resonates and oscillates appropriately around the oscillation axis A1. By such an oscillation driving of the mirror section 11, the reflection direction of the light, which is reflected by the mirror face 11a, can be switched.

For driving the oscillation of the micro-mirror element X1, the spring 13A and/or the spring 13B applies the deflection resistance generated by the deflection rigidity or flexural rigidity to the oscillation operation of the mirror section 11. Therefore in the micro-mirror element X1, a desired high rotational rigidity can be acquired for the mirror section 11 by appropriately adjusting the deflection rigidity of the springs 13A and 13B.

For driving the oscillation of the micro-mirror element X1, a driving force is applied to one of the oscillation ends (end where the movable electrode 14a or the movable electrode 14b is disposed in the mirror section 11) of the mirror section 11, and the springs 13A and 13B, which deflect along with the oscillation operation of the mirror section 11, apply tensile force to this oscillation end of the mirror section 11 respectively in a direction opposite from the oscillation direction. Therefore in the micro-mirror element X1, a small moment of inertia can be implemented by implementing a sufficient thinness for the mirror section 11, and an inappropriate deformation of the mirror section 11 in the oscillation direction can be prevented by appropriately adjusting the deflection rigidity of the springs 13A and 13B.

In this way, in the micro-mirror element X1, it is possible to acquire a high rotational rigidity and implement a small moment of inertia for the mirror section 11. Such a micro-mirror element X1 is preferable to operate at a high resonance frequency to implement a high-speed oscillation operation.

FIG. 3 to FIG. 9 show variant forms of the spring connection sections which can be used instead of the springs 13A and 13B in the micro-mirror element X1 respectively. In the micro-mirror element X1, a pair of spring connection sections, which respectively have a following shape according to the demanded characteristics, may be used instead of the springs 13A and 13B.

Figure 3A:
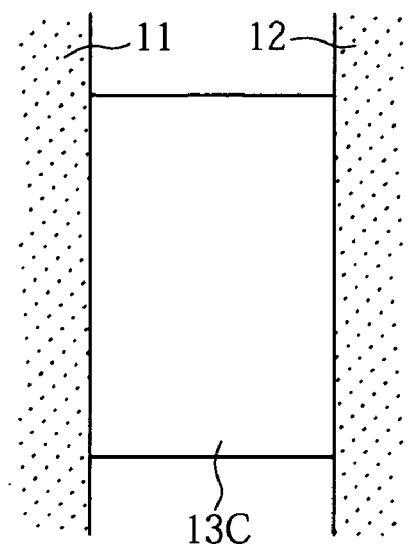
FIGS. 3A-3B show a variant form of the spring in the micro-mirror element according to the present invention, where
Figure 3B:
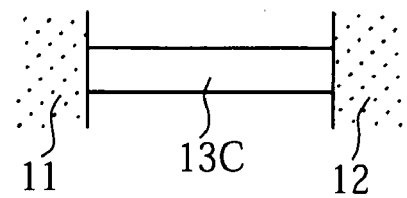

FIGS. 3A-3B shows the spring 13C as the first variant form. The spring 13C is a single plate spring which is rectangular from the top view (FIG. 3A), and has a uniform thickness (FIG. 3B).

Figure 4A:
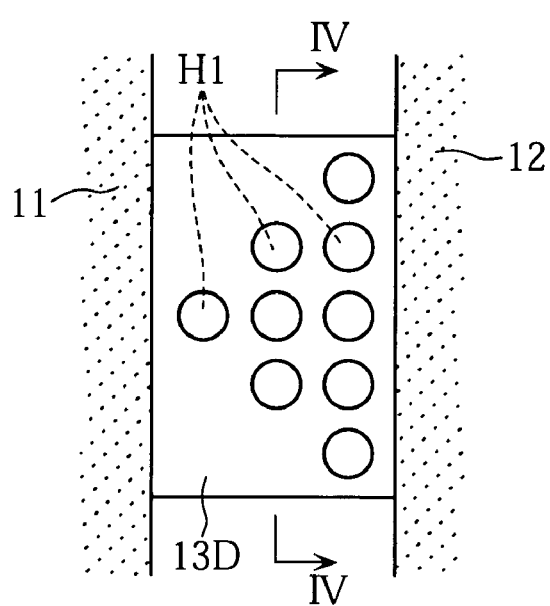
FIGS. 4A-4C show another variant form of the spring in the micro-mirror element according to the present invention, where
Figure 4B:
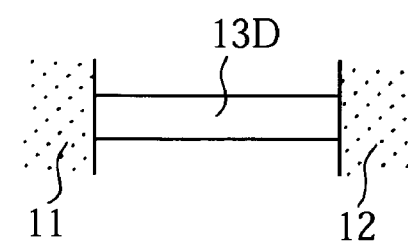
Figure 4C:
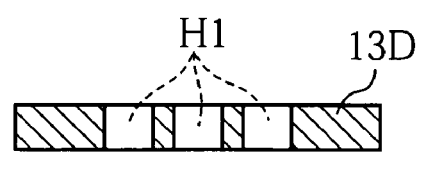

FIGS. 4A-4C show the spring 13D as the second variant form. The spring 13D is a single plate spring which is rectangular from the top view (FIG. 4A), with a uniform thickness (FIG. 4B or 4C), and has a plurality of holes H1. The hole H1 penetrates through the spring 13D in the thickness direction (FIG. 4C), and has a function to adjust the rigidity of the spring 13D. According to the oscillation characteristics (e.g. frequency characteristics) determined for the mirror section 11, the density, size and arrangement of the holes H1 are set. The opening shape of the hole H1 is not limited to circular, but may be ellipsoidal, rectangular, triangular or trapezoidal.

Figure 5A:
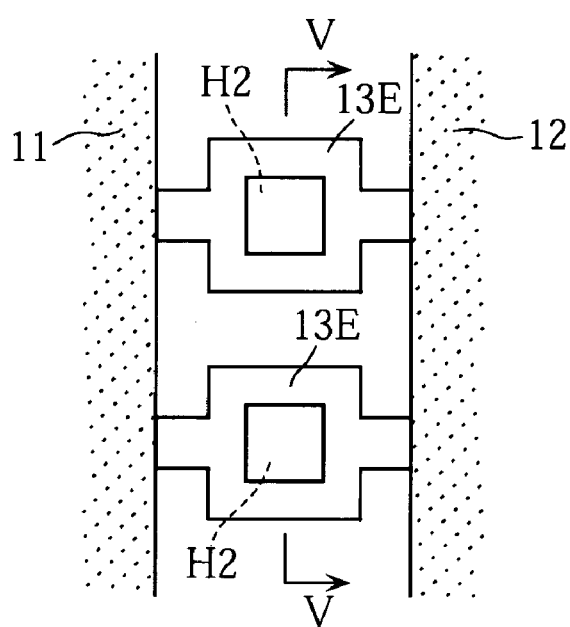
FIGS. 5A-5C show another variant form of the spring in the micro-mirror element according to the present invention, where
Figure 5B:
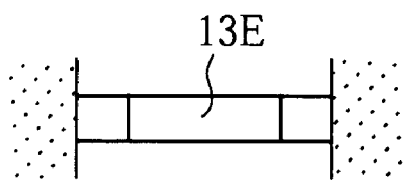
Figure 5C:
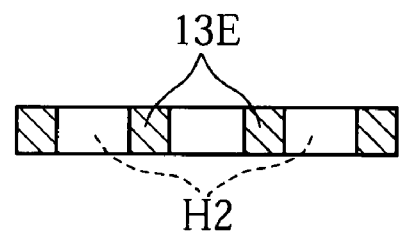

FIGS. 5A-5C show two springs 13E as the third variant form. The two springs 13E constitute a single spring connection section. Each spring 13E has a hole H2 at the center (FIG. 5A), and this hole H2 penetrates through the spring 13E in the thickness direction (FIG. 5C). The two springs 13E are arranged roughly in parallel to each other.

Figure 6A:
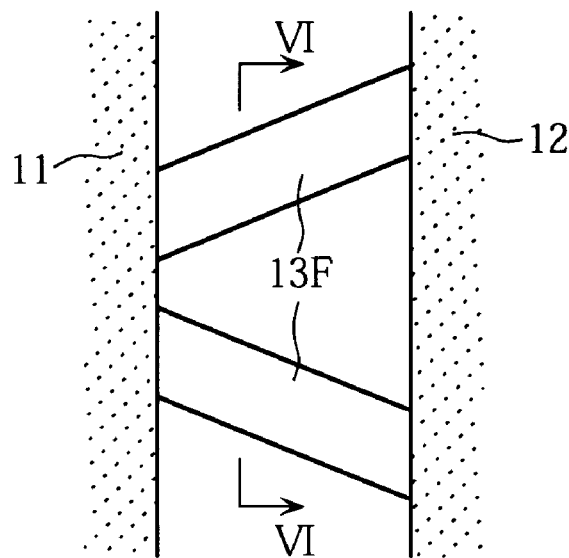
FIGS. 6A-6B show another variant form of the spring in the micro-mirror element according to the present invention, where
Figure 6B:
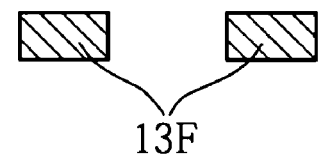

FIGS. 6A-6B show two springs 13F as the fourth variant form. The two springs 13F constitute a single spring connection section, and are arranged diagonally so that the springs become closer when approaching from the frame 12 side to the mirror section 11 (FIG. 6A). Each spring 13F may have a hole which penetrates in the thickness direction and/or in the width direction in order to decrease the rigidity thereof. Or each spring 13F may have reinforcing ribs which protrude in the thickness direction and/or in the width direction in order to increase the rigidity thereof.

Figure 7A:
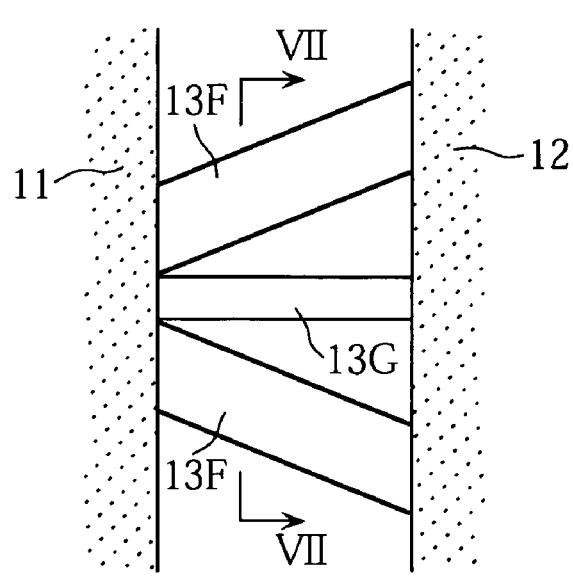
Figure 7B:
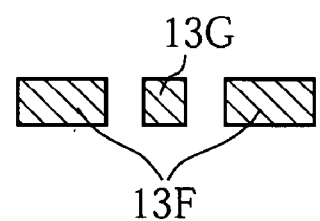

FIGS. 7A-7B show two springs 13F and one spring 13G as the fifth variant form. The springs 13F and 13G constitute a single spring connection section. The two springs 13F are arranged diagonally so that they gradually become closer when approaching from the frame 12 side to the mirror section 11, and the spring 13G is disposed between these springs 13F. A hole to decrease the rigidity or reinforcing ribs to increase the rigidity may be disposed in each spring 13F and 13G, which is the same as the fourth variant form.

Figure 8A:
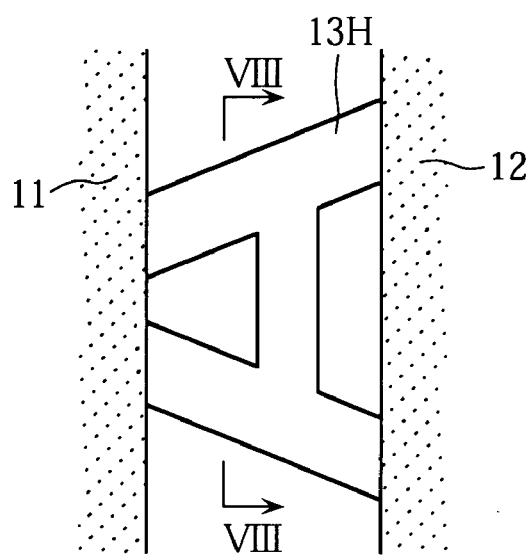
Figure 8B:
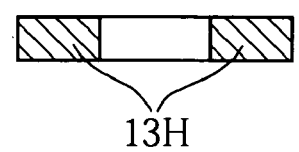

FIGS. 8A-8B show the spring 13H as the sixth variant form. The spring 13H is a single spring which is created roughly in an "A" shape from the top view (FIG. 8A). A hole to decrease the rigidity or reinforcing ribs to increase the rigidity may be disposed in this spring 13H as well.

Figure 9A:
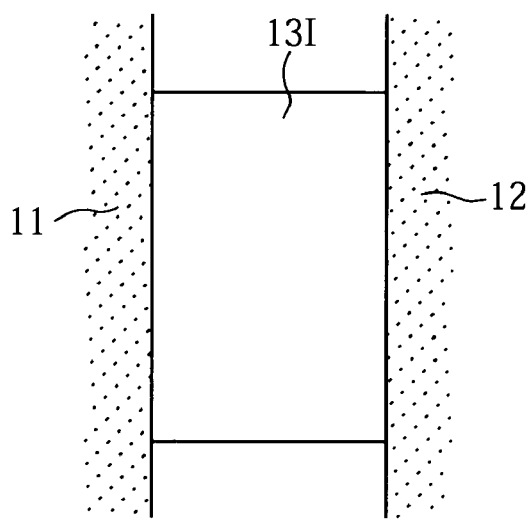
FIG. 9A is a plan view, and FIG. 9B a side view.
Figure 9B:
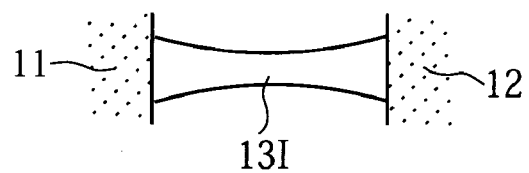

FIGS. 9A-9B show the spring 13I as the seventh variant form. The spring 13I is rectangular from the top view (FIG. 9A), with a thickness which changes between the mirror section 11 and the frame 12 (FIG. 9B). In this variant form, thickness is smallest at the center in the width direction of the spring 13I, but optionally the thickness may be gradually decreased when approaching from the mirror section 11 to the frame 12, or may be gradually decreased when approaching from the frame 12 to the mirror section 11. A hole to decrease the rigidity or reinforcing ribs to increase the rigidity may be disposed in the spring 13I.

Figure 10:
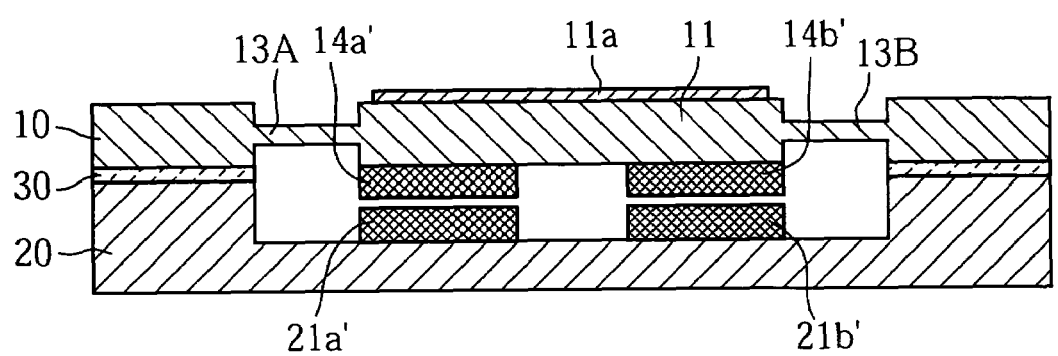
FIG. 10 is a cross-sectional view along the II-II line in FIG. 1, when a comb electrode is used as an actuator.
Figure 11:
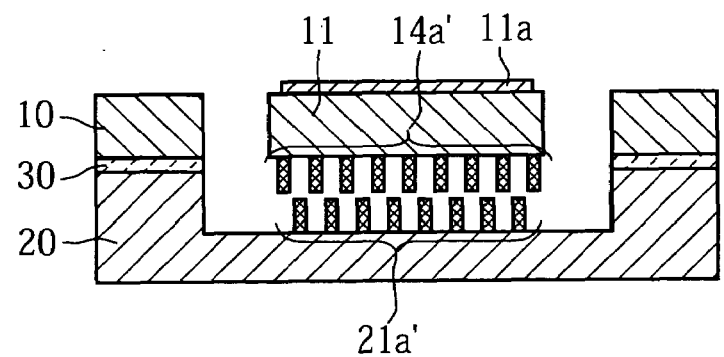
FIG. 11 is a cross-sectional view along the XI-XI line in FIG. 1 when a comb electrode is used as an actuator.

For the actuator of the micro-mirror element X1, a comb structure may be used instead of the flat electrode shown in FIG. 1 and FIG. 2. FIG. 10 and FIG. 11 show a micro-mirror element X1 where the movable electrodes 14a' and 14b' and the fixed electrodes 21a' and 21b' are used instead of the movable electrodes 14a and 14b and the fixed electrodes 21a and 21b. FIG. 10 is a cross-sectional view showing the cross-section along the II-II line in FIG. 1, and FIG. 11 is a cross-sectional view showing the cross-section along the XI-XI line in FIG. 1. The movable electrodes 14a' and 14b' are comprised of electrode teeth, which extend from the mirror section 11 to the base substrate 20 direction respectively. The fixed electrode 21a' is comprised of electrode teeth which extend from the base substrate 20 to the mirror section 11 direction, at a location corresponding to the movable electrode 14a'. The fixed electrode 21b' is comprised of electrode teeth which extend from the base substrate 20 to the mirror section 11 direction at a location corresponding to the movable electrode 14b'. The fixed electrode 21a' and the movable electrode 14a' constitute an actuator, which is comprised of a set of comb electrodes. In the same way, the fixed electrode 21b' and the movable electrode 14b' constitute an actuator, which is comprised of a set of comb electrodes.

For the actuator of the micro-mirror element X1, an electromagnetic type, using an electromagnetic coil or permanent magnet, for example, can be used instead of an electrostatic type using a flat electrode or a comb electrode, for example. Specifically, the movable electrodes 14a and 14b, disposed in the mirror section 11 in the micro-mirror element X1 shown in FIG. 1, are replaced with electromagnetic coils, and the fixed electrodes 21a and 21b disposed in the base substrate 20 are replaced with electromagnetic coils or permanent magnets. Or the movable electrodes 14a and 14b, disposed in the mirror section 11, are replaced with permanent magnets, and the fixed electrodes 21a and 21b disposed in the base substrate 20 are replaced with electromagnetic coils. In these configurations, the mirror section 11 can be driven by adjusting the current carrying status of an electromagnetic coil. The mirror section 11 may be driven by a piezoelectric element. In this case, the piezoelectric element is disposed in the springs 13A and 13B.

Figure 12:
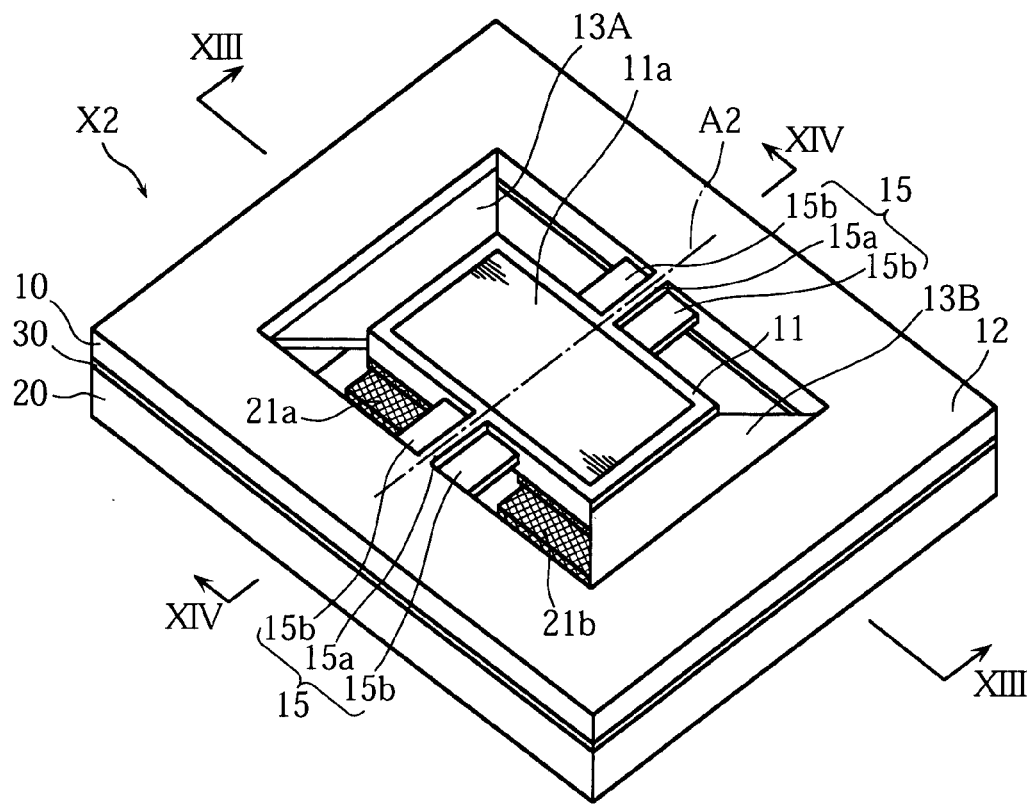
FIG. 12 is a perspective view depicting the micro-mirror element according to the second embodiment of the present invention.
Figure 13:
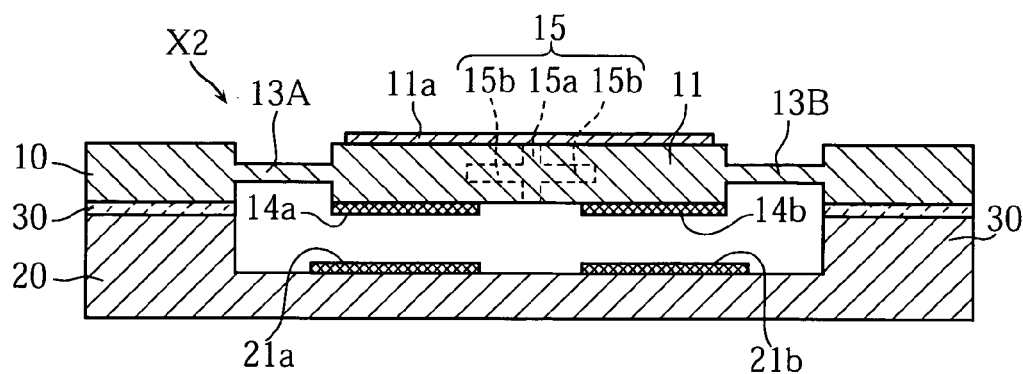
FIG. 13 is a cross-sectional view along the XIII-XIII line in FIG. 12.

FIG. 12 to FIG. 14 show a micro-mirror element X2 according to the second embodiment of the present invention. FIG. 12 is a perspective view of the micro-mirror element X2. FIG. 13 is a cross-sectional view along the XIII-XIII line in FIG. 12, and FIG. 14 is a cross-sectional view along the XIV-XIV line in FIG. 12. The micro-mirror element X2 has a structure where the mirror substrate 10 and the base substrate 20 are layered via the insulation layer 30, and the mirror substrate 10 is comprised of a mirror section 11, a frame 12, a pair of springs 13A and 13B, and a pair of torsion bars 15. The difference from the micro-mirror element X1 is that the micro-mirror element X2 has a pair of torsion bars 15, and the rest of the configuration and variant forms thereof are the same as the micro-mirror element X1.

The pair of torsion bars are connected to the mirror section 11 and the frame 12, and defines the oscillation axis A2 in the oscillation operation of the mirror section 11. Each one of the torsion bars 15 has a cross-shaped cross-section. Specifically, each torsion bar 15 is comprised of a thick section 15a which is longer in the thickness direction of the element, and thin sections 15b which extend to both sides of the thick section 15a. The oscillation axis A2 passes through the thick section 15a of both torsion bars. These thin sections 15b included in a single torsion bar 15 extend in the directions that intersect with the oscillation axis A2. This cross-sectional shape of the torsion bar 15 is preferable in terms of both acquiring the torsional rigidity of the torsion bar 15 and suppressing an inappropriate displacement in the mirror section 11. By the thick section 15a, the translational displacement of the mirror section in a direction vertical to the mirror substrate 10 or mirror face 11a is suppressed, and the rotational displacement of the mirror section 11 in the in-plane direction of the mirror section 11 in the mirror substrate 10 or mirror face 11a is suppressed.

In the micro-mirror element X2, if the fixed electrode 21a of the base substrate 20 is charged to negative in the status where the movable electrodes 14a and 14b of the mirror section 11 are charged to positive, for example, electrostatic attraction is generated between the fixed electrode 21a and the movable electrode 14a, and the mirror section 11 oscillates in the counterclockwise direction in FIG. 13 with the oscillation axis A2 as the center, while deflecting the spring 13A downward and deflecting the spring 13B upward. If the fixed electrode 21b is charged to negative in the status where the movable electrodes 14a and 14b are charged to positive, on the other hand, electrostatic attraction is generated between the fixed electrode 21b and the movable electrode 14b, and the mirror section 11 oscillates in the clockwise direction in FIG. 13 with the oscillation axis A2 as the center, while deflecting the spring 13B downward and deflecting the spring 13A upward. By such an oscillation driving of the mirror section 11, the reflection direction of the light reflected from the mirror face 11a can be switched.

In the micro-mirror element X2, a high rotational rigidity can be acquired and a small moment of inertia can be implemented for the mirror section 11 because of the presence of the springs 13A and 13B, just like the abovementioned micro-mirror element X1. In addition, in the case of the micro-mirror element X2, a more stable oscillation operation can be more easily implemented since the pair of torsion bars 15 defines the oscillation axis A2 in the oscillation operation of the mirror section 11. This micro-mirror element X2 is preferable to operate at a high resonance frequency to implement a high-speed oscillation operation.

FIGS. 15 and 16 show a variant from of the torsional connection section which can be used instead of the torsion bars 15 in the micro-mirror element X2. In the micro-mirror element X2, a pair of torsional connection sections, each of which has a following shape, may be used instead of the torsion bars 15 according to the demanded characteristics.

FIGS. 15A-15B show the torsion bar 15A as the first variant form. The torsion bar 15A is a single torsion bar of which the cross-sectional shape is a simple rectangle, with a uniform width and uniform thickness. In this torsion bar 15A, a hole to decrease the rigidity (see FIG. 4) or reinforcing ribs to increase the rigidity may be disposed. The thickness and the width of the torsion bar 15A may be changed in the area between the mirror section 11 and the frame 12 (see FIG. 5, FIG. 8 and FIG. 9). A plurality of torsion bars may be disposed in parallel (see FIG. 5-FIG. 7).

Figure 16A:
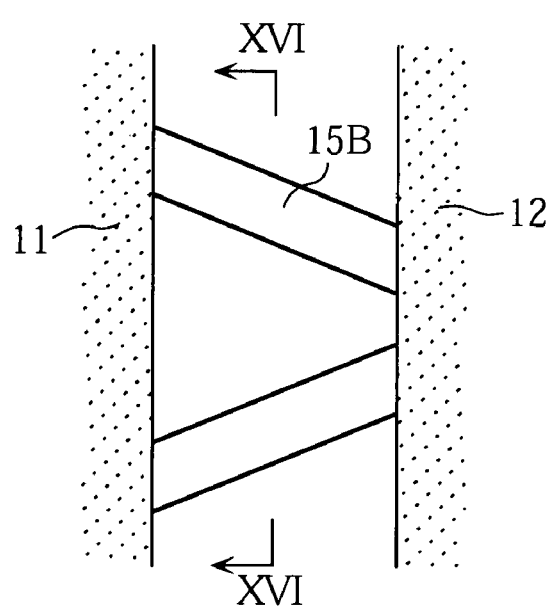
Figure 16B:
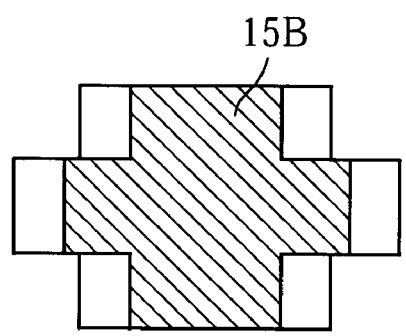

FIGS. 16A-16B show the torsion bar 15B as the second variant form. The torsion bar 15B is cross-shaped in the cross-section (FIG. 16B), and the width gradually decreases when approaching from the mirror section 11 to the frame 12 (FIG. 16A). The width of the torsion bar 15B may be gradually decreased when approaching from the frame 12 to the mirror section 11, instead of gradually decreasing when approaching from the mirror section 11 to the frame 12.

Figure 17:
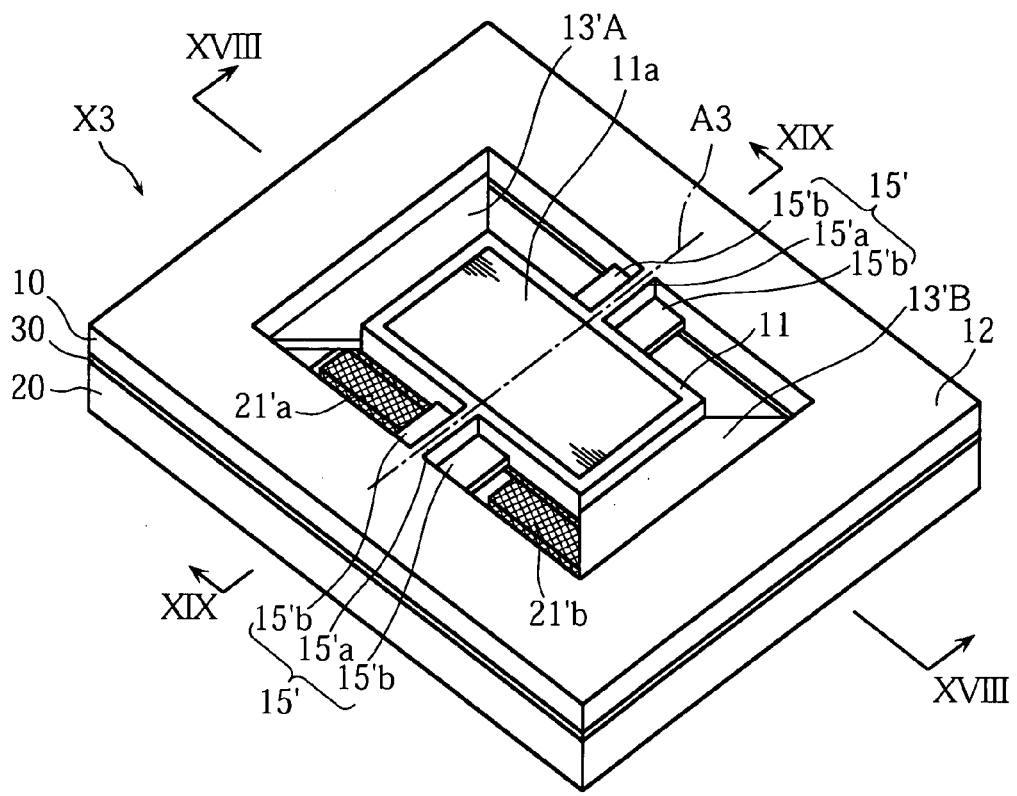
FIG. 17 is a perspective view depicting the micro-mirror element according to the third embodiment of the present invention.
Figure 18:
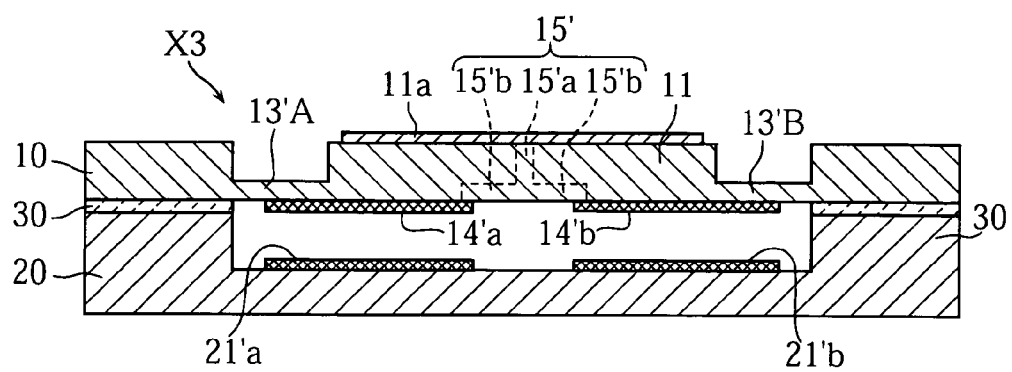
FIG. 18 is a cross-sectional view along the XVIII-XVIII line in FIG. 17.
Figure 19:
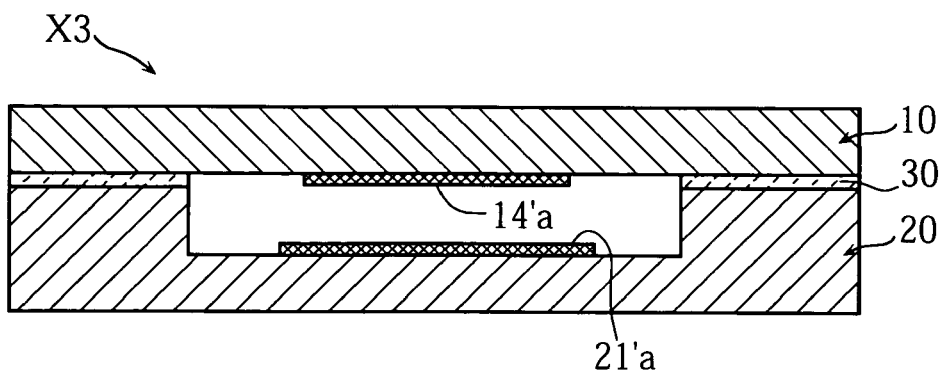
FIG. 19 is a cross-sectional view along the XIX-XIX line in FIG. 17.

FIG. 17 to FIG. 19 show the micro-mirror element X3 according to the third embodiment of the present invention. FIG. 17 is a perspective view of the micro-mirror element X3. FIG. 18 is a cross-sectional view along the XVIII-XVIII line in FIG. 17, and FIG. 19 is a cross-sectional view along the XIX-XIX line in FIG. 17. The micro-mirror element X3 has a structure where the mirror substrate 10 and the base substrate 20 are layered via the insulation layer 30, and the mirror substrate 10 is comprised of a mirror section 11, a frame 12, a pair of springs 13'A and 13'B, and a pair of torsion bars 15'. In the mirror substrate 10, movable electrodes 14'a and 14'b are disposed, and in the base substrate 20, fixed electrodes 21'a and 21'b are disposed. The difference from the micro-mirror element X2 is that the micro-mirror element X3 is comprised of the springs 13'A and 13'B, movable electrodes 14'a and 14'b, fixed electrodes 21'a and 21'b, and a pair of torsion bars 15', instead of the springs 13A and 13B, movable electrodes 14a and 14b, fixed electrodes 21a and 21b and the pair of torsion bars 15.

The springs 13'A and 13'B are located away from the oscillation axis A3 of the mirror section 11, and the mirror section 11 and the frame are integrated by processing the mirror substrate 10 by bulk micro-machining technology. In the present embodiment, each of the springs 13'A and 13'B has a trapezoidal shape, where the frame 12 side is wider and the mirror section 11 side is narrower, and has a uniform thickness in the width direction and length direction of the mirror section 11. The springs 13'A and 13'B are formed such that the bottom face thereof and the bottom face of the mirror section 11 constitute one plane.

As FIG. 18 shows, the movable electrode 14'a is disposed on the area from the bottom face of the mirror section 11 to the bottom face of the spring 13'A, and also as FIG. 18 shows, the movable electrode 14'b is disposed on the bottom face of the mirror section 11 and the bottom face of the spring 13'B. The material and formation method of the movable electrodes 14'a and 14'b are the same as the abovementioned movable electrodes 14a and 14b.

The fixed electrode 21'a is disposed on the base substrate 20 at a position facing the movable electrode 14'a with an appropriate space. The fixed electrode 21'a and the movable electrode 14'a constitute an actuator, which is comprised of a set of electrodes. The fixed electrode 21'b is disposed on the base substrate 20 at a position facing the movable electrode 14'b with an appropriate space. The fixed electrode 21'b and the movable electrode 14'b constitute an actuator, which is comprised of a set of electrodes.

The pair of torsion bars 15' are connected to the mirror section 11 and the frame 12, and define the oscillation axis A3 in the oscillation operation of the mirror section 11. As FIG. 18 shows, the torsion bar 15' is comprised of a thick section 15'a which is long in the thickness direction of the element, and thin sections 15'b which extend to both sides from the thick section 15'a. The oscillation axis A3 passes through the thick section 15'a of the both torsion bars 15'. The thin sections 15'b, included in the single torsion bar 15', extend in the directions that intersect with the oscillation axis A3. Such a cross-sectional shape of the torsion bar 15' is preferable to efficiently implement both acquiring the torsional rigidity of the torsion bar 15' and suppressing an inappropriate displacement of the mirror section 11. By the thick section 15'a, the translational displacement of the mirror section 11 in a direction vertical to the mirror substrate 10 or mirror face 11a is suppressed, and by the thin section 15'b, the rotational displacement of the mirror section 11 in the in-plane directions of the mirror substrate 10 or mirror face 11a is suppressed.

In the micro-mirror element X3, if the fixed electrode 21'a of the base substrate 20 is charged to negative in the status where the movable electrodes 14'a and 14'b of the mirror section 11 are charged to positive, for example, electrostatic attraction is generated between the fixed electrode 21'a and the movable electrode 14'a, and the mirror section 11 oscillates in the counterclockwise direction in FIG. 18 with the oscillation axis A3 as the center, while deflecting the spring 13'A downward and deflecting the spring 13'B upward. If the fixed electrode 21'b is charged to negative in the status where the movable electrodes 14'a and 14'b are charged to positive, on the other hand, electrostatic attraction is generated between the fixed electrode 21'b and the movable electrode 14'b, and the mirror section 11 oscillates in the clockwise direction in FIG. 18 with the oscillation axis A3 as the center, while deflecting the spring 13'B downward and deflecting the spring 13'A upward. By such an oscillation driving of the mirror section 11, the reflection direction of the light reflected from the mirror face 11a can be switched.

In the micro-mirror element X3, the movable electrode 14'a is disposed on the area from the bottom face of the mirror section 11 to the bottom face of the spring 13'A, which is the same plane as the bottom face of the mirror section 11, and the movable electrode 14'b is disposed on the area from the bottom face of the mirror section 11 to the bottom face of the spring 13'B, which is the same plane as the bottom face of the mirror section 11. Fixed electrodes 21'a and 21'b, which appropriately face with the movable electrodes 14'a and 14'b in the wide area, can be disposed on the inner bottom face of the base substrate 20. In this way, the micro-mirror element X3 comprises relatively large movable electrodes, and is preferable to constitute a flat electrode type actuator which has a relatively large electrostatic force generation area. As the actuator has a bigger electrostatic force generation area, it is more preferable to acquire a larger driving force.

Figure 20:
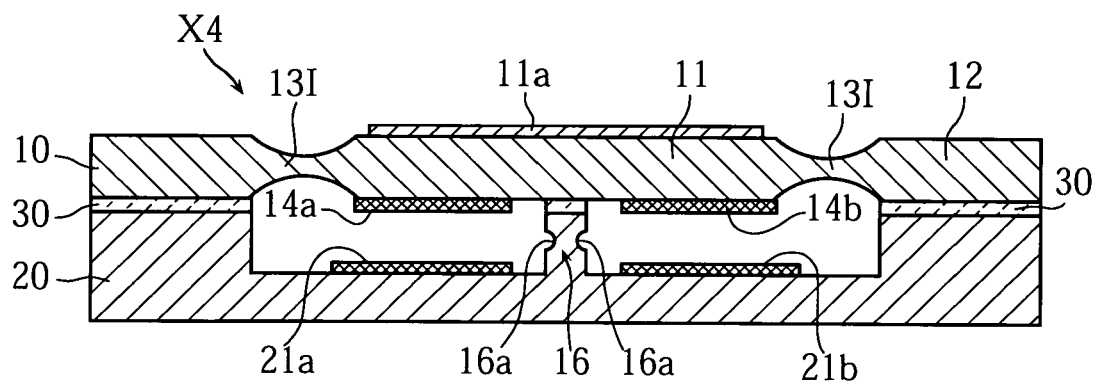
FIG. 20 is a cross-sectional view depicting the micro-mirror element according to the fourth embodiment of the present invention.

FIG. 20 shows the micro-mirror element X4 according to the fourth embodiment of the present invention, and is a cross-sectional view corresponding to the same section in FIG. 2. The difference from the micro-mirror element X1 is that the micro-mirror element X4 has a pair of springs 13I, instead of the springs 13A and 13B, and has the support spring 16, and the rest of the configuration is the same as the micro-mirror element X1.

The support spring 16 extends over the entire width of the mirror section 11, and connects the base section 20 and the mirror section 11. A notch 16a is formed on both side faces of the support spring 16. These notches 16a create the neck section (thin section) of the support spring 16, and the mirror section 11 oscillates with the neck section as the oscillation axis. In the support section 16, a hole for decreasing the rigidity or reinforcing ribs for increasing the rigidity may be disposed.

In the micro-mirror element X4, just like the above described micro-mirror element X1, a high rotational rigidity can be acquired and a small moment of inertia can be implemented for the mirror section 11 because of the presence of the pair of springs 13I. In addition, in the micro-mirror element X4, the mirror section 11 can perform an oscillation operation with the neck section of the support spring 16 as the oscillation axis, so stable oscillation operation can be implemented more easily. Such a micro-mirror element X4 is preferable to operate at a high resonance frequency, so as to implement a high-speed oscillation operation.

Figure 21:
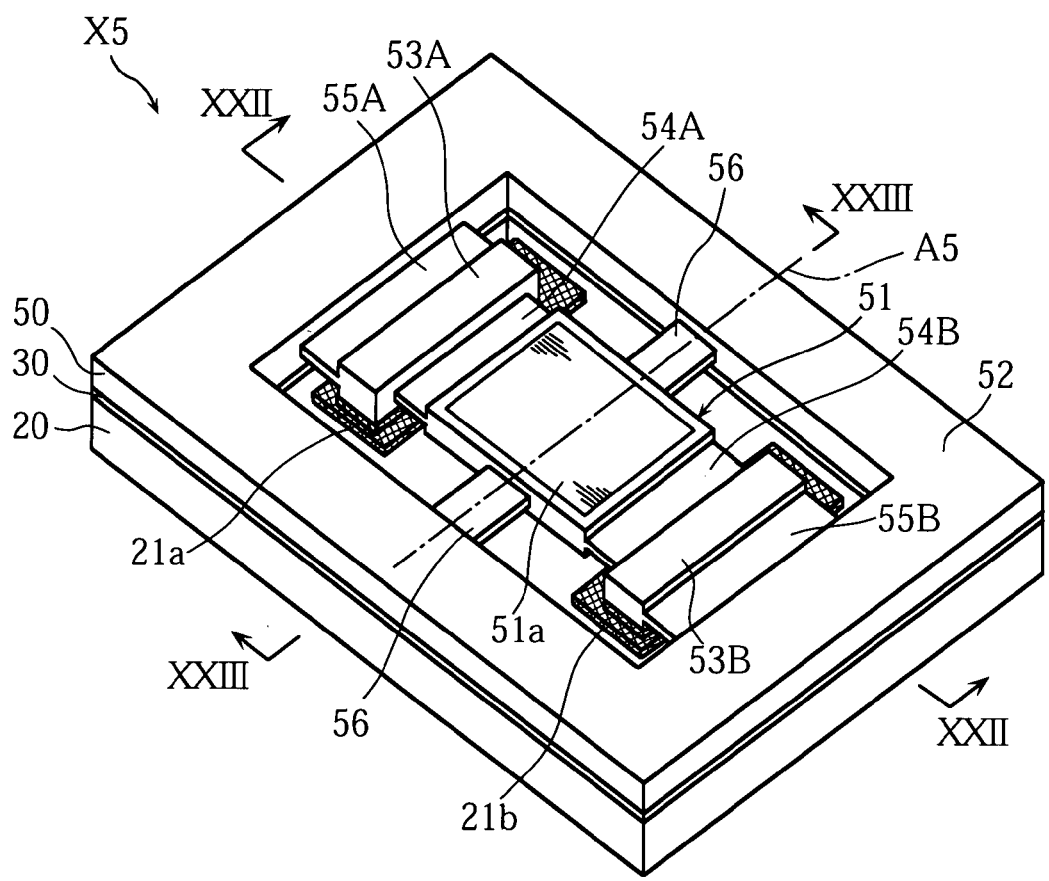
FIG. 21 is a perspective view depicting the micro-mirror element according to the fifth embodiment if the present invention.
Figure 22:
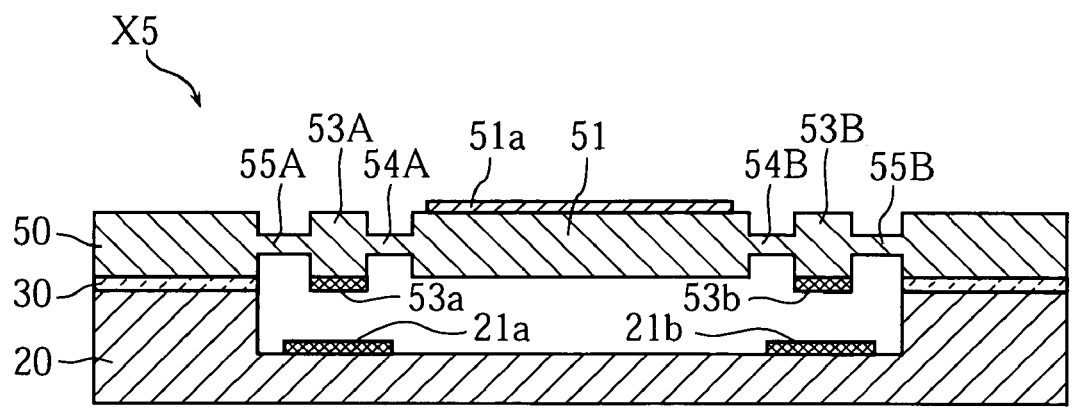
FIG. 22 is a cross-sectional view along the XXII-XXII line in FIG. 21.
Figure 23:
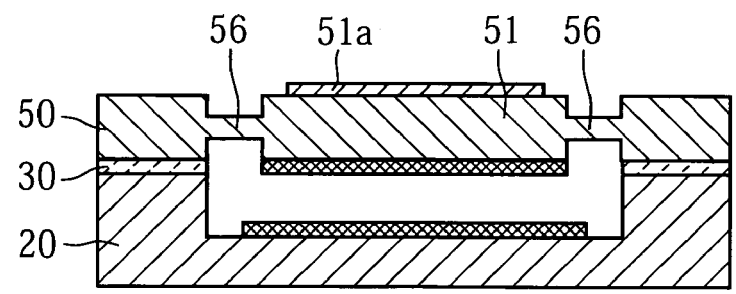
FIG. 23 is a cross-sectional view along the XXIII-XXIII line in FIG. 21.
Figure 24:
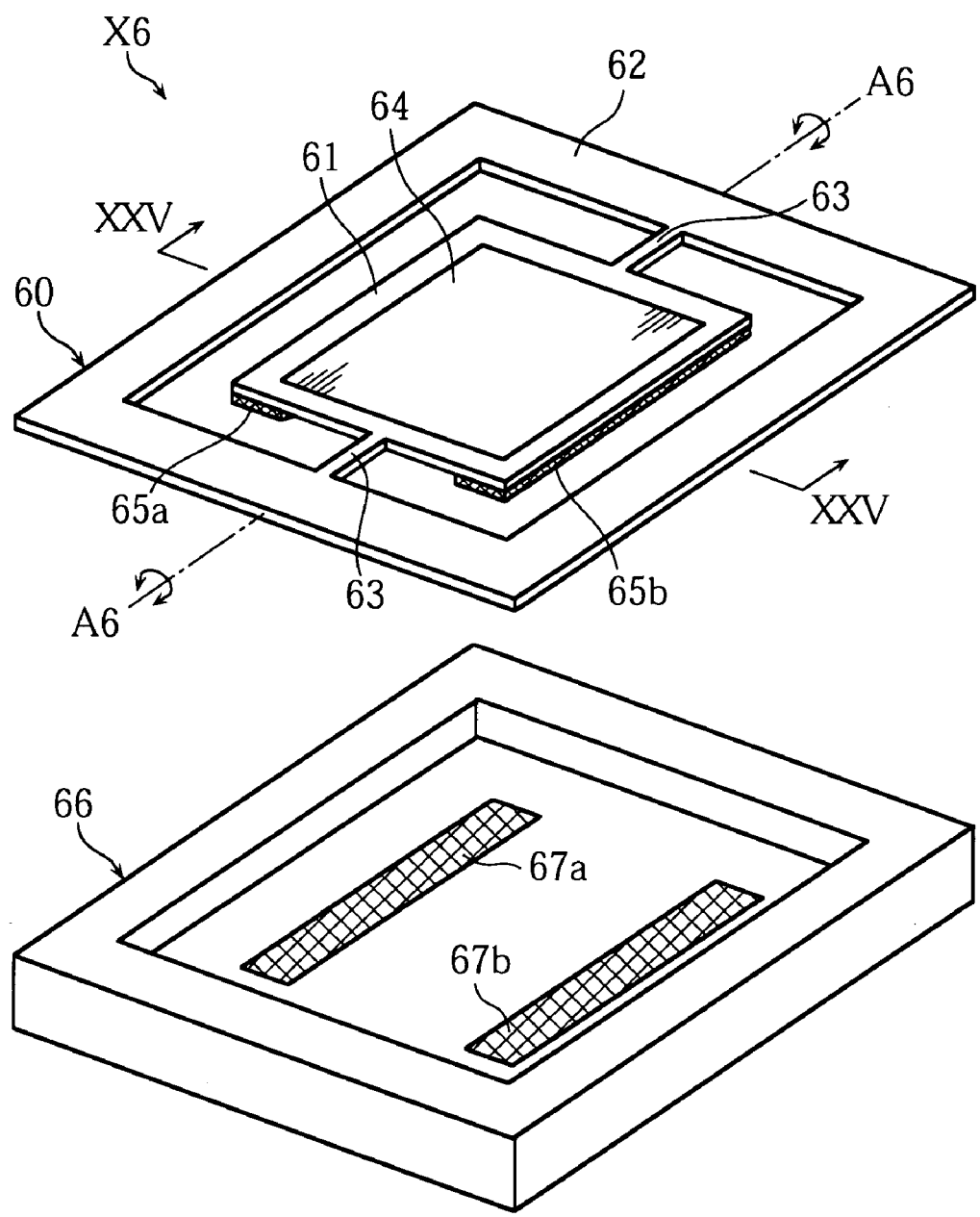
FIG. 24 is an exploded perspective view depicting a conventional micro-mirror element.
Figure 25:
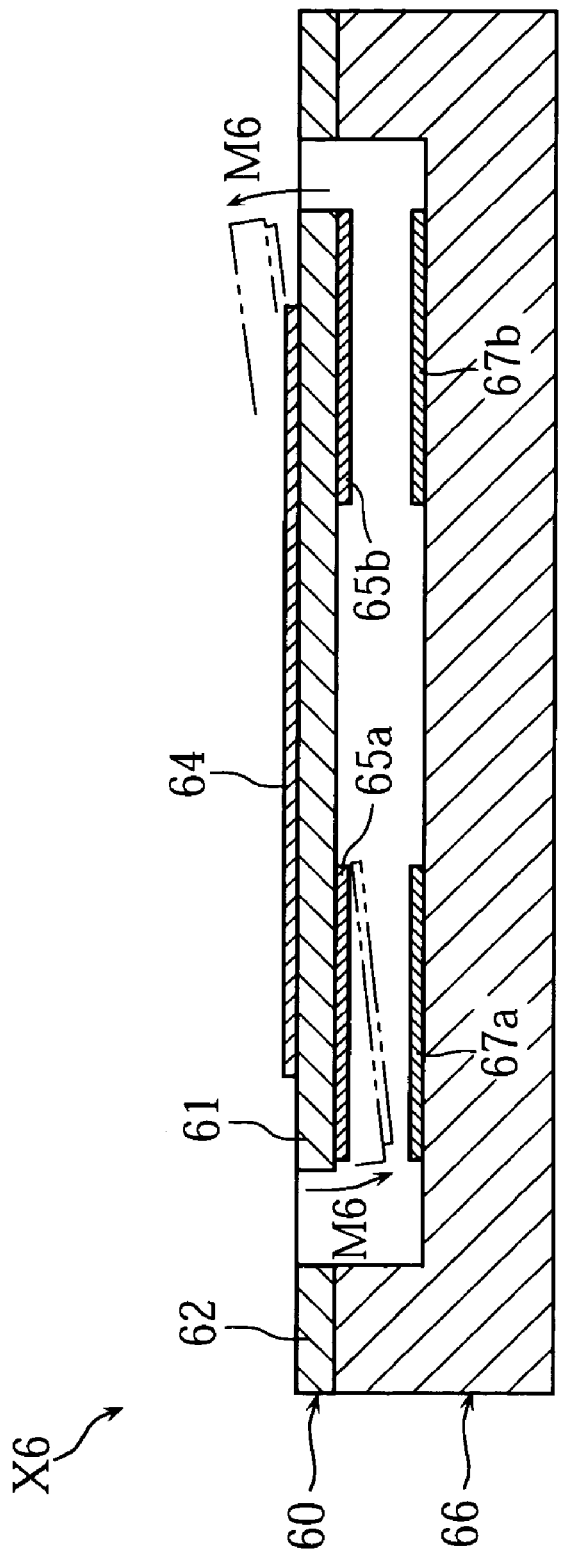
FIG. 25 is a cross-sectional view along the XXV-XXV line of the micro-mirror element in FIG. 24 in assembled status.

FIG. 21 to FIG. 23 show the micro-mirror element X5 according to the fifth embodiment. FIG. 21 is a perspective view of the micro-mirror element X5, FIG. 22 is a cross-sectional view along the XXII-XXII line in FIG. 21, and FIG. 23 is a cross-sectional view along the XXIII-XXIII line in FIG. 22. The micro-mirror element X5 has a structure where the mirror substrate 50 and the base substrate 20 are layered via the insulation layer 30.

The mirror substrate 50 is comprised of a mirror section 51, a frame surrounding this 52, actuating sections 53A and 53B, thin sections 54A and 54B, springs 55A and 55B, and a pair of torsion bars 56. The thin section 54A connects the mirror section 51 and the actuating section 53A, and the spring 55A connects the actuating section 53A and the frame 52. The thin section 54B connects the mirror section 51 and the actuating section 53B, and the spring 55B connects the actuating section 53B and the frame 52. The torsion bar 56 connects the mirror section 51 and the frame 52. Just like the above description of the mirror substrate 10 of the first embodiment, the mirror substrate 50 is formed by bulk micro-machining technology, from a silicon substrate to which conductivity is provided by doping such n-type impurities as P and As, or a p-type impurity as B, for example.

The mirror face 51a is disposed on the surface of the mirror section 51, and the movable electrodes 53a and 53b are disposed on the rear faces of the actuating section 53A and 53B respectively. The mirror face 51a and the movable electrodes 53a and 53b can be formed by patterning the metal film after depositing a predetermined metal material onto a film by a depositing method. If the conductivity of the mirror substrate 50 is set to sufficiently high by a doping impurity, the actuating sections 53A and 53B themselves can function as electrodes, so the moving electrodes 53a and 53b need not be disposed.

The pair of torsion bars 56 are connected to the mirror section 51 and the frame 52, and define the oscillation axis A5 in the oscillation operation of the mirror section 51. Each of the torsion bars 56 has a rectangular cross-sectional shape. In the present invention, each of the torsion bars 56 may have another cross-sectional shape. For example, a cross-shape can be used as such a cross-sectional shape.

The difference from the micro-mirror element X1 is that the micro-mirror element X5 has the abovementioned mirror substrate 50, instead of the mirror substrate 10, and the rest of the configuration is the same as the micro-mirror element X1.

In the micro-mirror element X5, if the fixed electrode 21a of the base substrate 20 is charged to negative in the status where the movable electrodes 53a and 53b of the mirror section 51 are charged to positive, for example, electrostatic attraction is generated between the fixed electrode 21a and the movable electrode 53a, and the mirror section 51 oscillates in the counterclockwise direction in FIG. 22, with the oscillation axis A5 as the center while deflecting the spring 55A downward and deflecting the spring 55B upward. If the fixed electrode 21b is charged to negative in the status where the movable electrodes 53a and 53b are charged to positive, on the other hand, electrostatic attraction is generated between the fixed electrode 21b and the movable electrode 53b, and the mirror section 51 oscillates in the clockwise direction in FIG. 22, with the oscillation axis A5 as the center, while deflecting the spring 55B downward and deflecting the spring 55A upward. By such an oscillation drive of the mirror section 51, the reflection direction of the light reflected by the mirror face 51a can be switched.

In the micro-mirror element X5, the spring 55A applies the deflection resistance generated from the deflection rigidity or flexural rigidity to the oscillation operation of the mirror section 51 via the actuating section 53A and the thin section 54A, and the spring 55B applies the deflection resistance generated from the deflection rigidity or flexural rigidity to the oscillation operation of the mirror section 51 via the actuating section 53B and the thin section 54B. Therefore in the micro-mirror element X5 as well, a desired high rotational rigidity can be acquired for the mirror section 51 by appropriately adjusting the deflection rigidity of the springs 55A and 55B, just like the case of the micro-mirror element X1. In the present element, the rotational rigidity of the mirror section 51 can be adjusted by appropriately adjusting the deflection rigidity of the thin sections 54A and 54B.

While the driving force acts on the oscillation ends of the mirror section 51 in the oscillation direction, the spring 55B, which deflects along the oscillation operation of the mirror section 51, applies tensile force to the mirror section 51 or to one of the oscillation ends thereof in a direction opposite from the oscillation direction via the actuating section 53A and the thin section 54A. The spring 55B, which deflects along the oscillation operation of the mirror section 51, applies tensile force to the mirror section 51 or to the other of the oscillation ends thereof in a direction opposite from the oscillation direction via the actuating section 53B and the thin section 54B. Therefore in the micro-mirror element X5, a desired small moment of inertia can be implemented by achieving a sufficient thinness of the mirror section 51, and an inappropriate deformation of the mirror section 51 in the oscillation direction can be prevented by appropriately adjusting the deflection rigidity of the springs 55A and 55B. In the present element, an inappropriate deformation of the mirror section 51 can also be suppressed by appropriately adjusting the deflection rigidity of the thin sections 54A and 54B.

As described above, according to the micro-mirror element X5, a high rotational rigidity can be acquired and a small moment of inertia can be implemented for the mirror section 51. Such a micro-mirror element X5 is preferable to operate at a high resonance frequency, so as to implement a high-speed oscillation operation.

According to the present invention, two frames of different sizes may be provided in a manner such that the smaller frame (inner frame) is arranged in the opening of the larger frame (outer frame), with the larger frame fixed to the base section. In this case, the inner frame may support an oscillation section via a first and a second springs, as in the first embodiment with reference to FIG. 1, and the inner frame may be connected to the outer frame via a third and a fourth springs so as to be able to oscillate relative to the outer frame. The outer frame may be fixed to a base member like the base section 20 shown in FIGS. 1 and 2. In this arrangement, the inner frame is located between the third spring and the fourth spring, each of which is deformable along with the oscillation of the inner frame. Typically, the direction in which the first and the second springs are spaced from each other is rendered orthogonal to the direction in which the third and the fourth springs are spaced from each other, so that the central oscillation section can oscillate about two oscillation axes intersecting at 90°. Preferably, such a micro-oscillation element may further include a torsion bar defining the oscillation axis of the oscillation of the oscillation section relative to the inner frame, and another torsion bar defining the oscillation axis of the oscillation of the inner frame relative to the outer frame. Typically, these two oscillation axes intersect at 90°.

Various embodiments of the present invention were described above, but the present invention shall not be limited by these embodiments, but can be modified in various ways. For example, the present invention is applied to a micro-mirror element in all of the above embodiments, but diffraction grating, a light source or a light detector may be disposed in the oscillation section, instead of the mirror section 11 or 51. Also the micro-oscillation element according to the present invention may further comprise displacement detection means for detecting the relative rotational displacement between the frame and the oscillation section.

The invention claimed is:

1. A micro-oscillation element comprising:
   an oscillation section;
   a main frame;
   at least one torsion bar connecting the oscillation section to the main frame for defining an oscillation axis about which the oscillation section pivotally oscillates relative to the main frame; and
   a first spring and a second spring that cause the oscillation section to be supported by the frame;
   wherein the oscillation section is located between the first spring and the second spring, each of the first spring and the second spring being deformable in response to oscillation of the oscillation section about the oscillation axis;
   wherein the torsion bar is connected to a first portion of the oscillation section at which the oscillation axis passes, each of the first and second springs being connected to a second portion of the oscillation section that is located away from the oscillation axis; and
   wherein each of the first and second springs has width which is largest at a portion for connection to the frame and progressively decreases toward the oscillation section.

2. The micro-oscillation element according to claim 1, wherein the first and the second springs are plate springs.

3. The micro-oscillation element according to claim 1, wherein the torsion bar has a cross-shape in a cross-section orthogonal to the oscillation axis.

4. The micro-oscillation element according to claim 1, wherein at least one of the first spring, the second spring and the torsion bar is formed with at least one hole.

5. The micro-oscillation element according to claim 1, wherein at least one of the first spring, the second spring and the torsion bar has a nonconstant width.

6. The micro-oscillation element according to claim 1, wherein at least one of the first spring, the second spring and the torsion bar has a nonconstant thickness.

7. The micro-oscillation element according to claim 1, further comprising an actuator for generating a driving force causing oscillation of the oscillation section.

8. The micro-oscillation element according to claim 7, wherein a difference between a frequency of the driving force generated by the actuator and a resonance frequency of the oscillation of the oscillation section is 1% or less of the resonance frequency.

9. The micro-oscillation element according to claim 1, wherein the oscillation section is provided with a mirror face for reflecting light.

10. The micro-oscillation element according to claim 1, further comprising: a second frame disposed outward of the main frame; and third and fourth springs connecting the second frame to the main frame;
    wherein the main frame is located between the third spring and the fourth spring, each of the third and the fourth springs being deformable along with oscillation of the main frame.

11. The micro-oscillation element according to claim 10, wherein a direction in which the first and the second springs are spaced from each other intersects a direction in which the third and the fourth springs are spaced from each other.

12. The micro-oscillation element according to claim 11, further comprising: at least one torsion bar defining a second oscillation axis about which the main frame oscillates relative to the second frame.

13. The micro-oscillation element according to claim 12, wherein the second oscillation axis intersects the oscillation axis of the oscillation section.

14. The micro-oscillation element according to claim 13, wherein the second oscillation axis intersects the oscillation axis of the oscillation section at 90°.

15. The micro-oscillation element according to claim 1, wherein each of the first and second springs has thickness which is larger at portions for connection to the frame and the oscillation section, respectively, while being smaller at an intermediate portion between the frame and the oscillation section.

* * * * *